United States Patent [19]

Gordy et al.

[11] 4,122,393
[45] Oct. 24, 1978

[54] SPREAD SPECTRUM DETECTOR

[75] Inventors: Robert S. Gordy, Largo; David E. Sanders, St. Petersburg; Ramon P. Chambers, Clearwater, all of Fla.

[73] Assignee: NCR Corporation, Dayton, Ohio

[21] Appl. No.: 795,697

[22] Filed: May 11, 1977

[51] Int. Cl.$^2$ .............................................. H04B 1/10
[52] U.S. Cl. ........................................ 325/324; 325/65
[58] Field of Search ................. 325/321, 323, 324, 42, 325/65, 474; 329/110, 50; 328/133

[56] References Cited

U.S. PATENT DOCUMENTS

| | | | |
|---|---|---|---|
| 3,659,229 | 4/1972 | Milton | 325/42 |
| 4,017,798 | 4/1977 | Gordy | 325/42 |
| 4,041,391 | 8/1977 | Deerkoski | 325/473 |
| 4,045,796 | 8/1977 | Kline | 325/42 |

Primary Examiner—Robert L. Griffin
Assistant Examiner—Michael A. Masinick
Attorney, Agent, or Firm—J. T. Cavender; Edward Dugas

[57] ABSTRACT

The detector of the present invention includes a first and a second signal channel each of which is adapted to receive a spread spectrum signal, or any other similar type multi-modulated carrier signal. In the preferred embodiment of the invention, the first signal channel is provided with a correlator for partially demodulating the received signal, as to one modulation signal component, with a demodulation signal derived from the second signal channel. The first signal channel is also provided with an additional correlator for demodulating the partially demodulated signal as to another modulation component. The second signal channel is comprised of a means for generating a dithered demodulation signal which signal is driven into synchronization with a corresponding modulation signal component in the received signal so as to enable the accurate generation of the demodulation signal utilized by the first signal channel.

17 Claims, 17 Drawing Figures

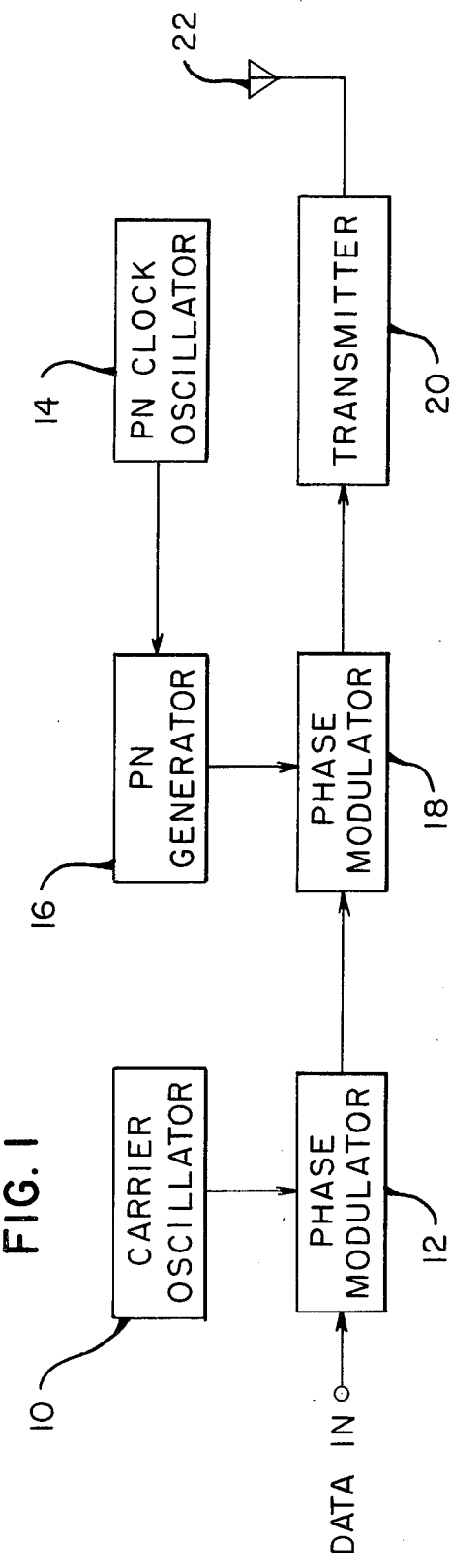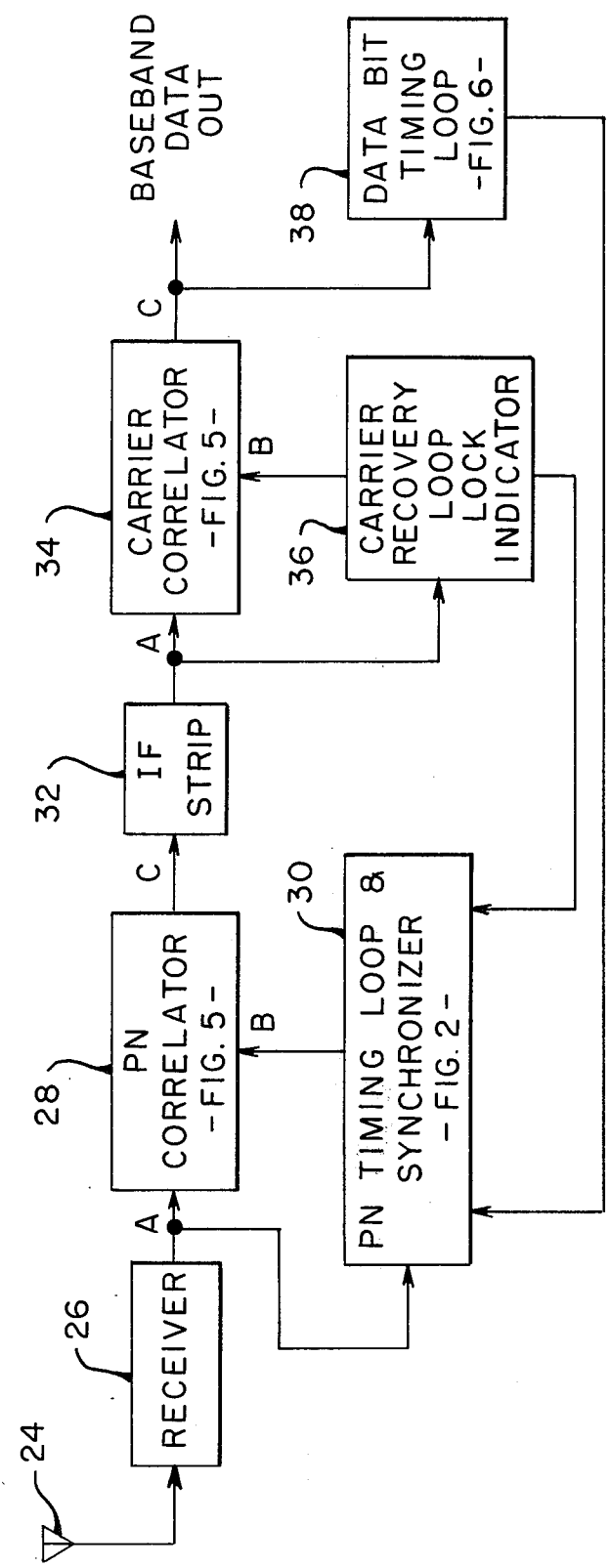
FIG. 1

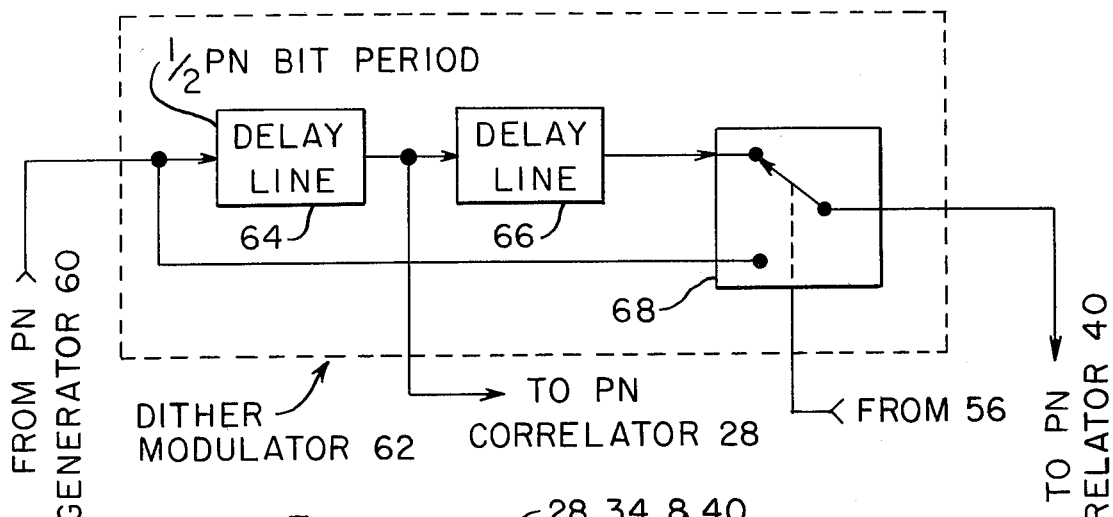
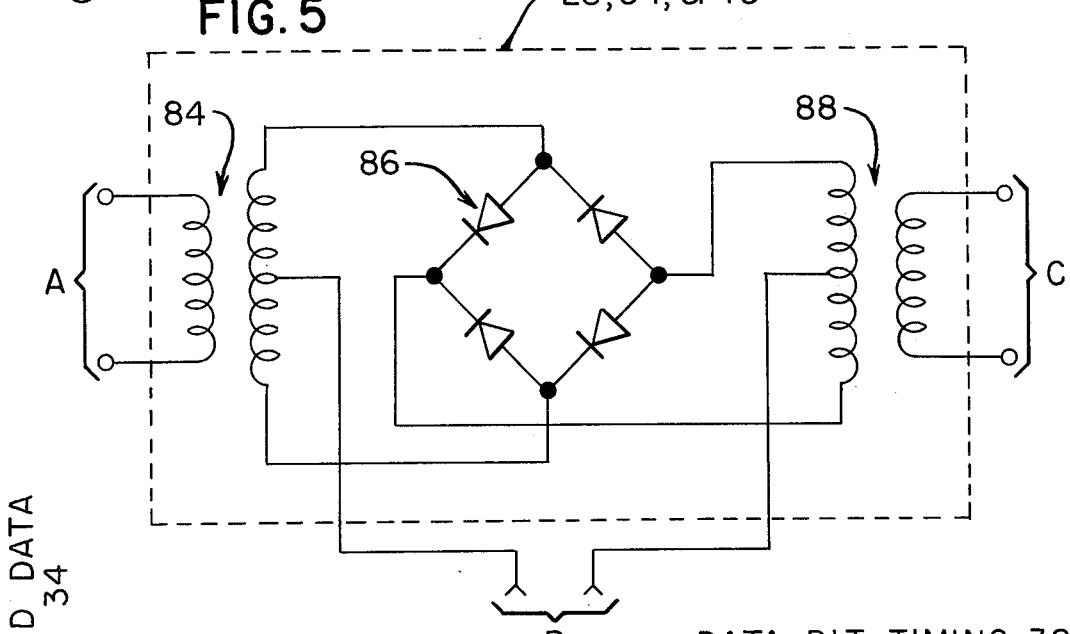
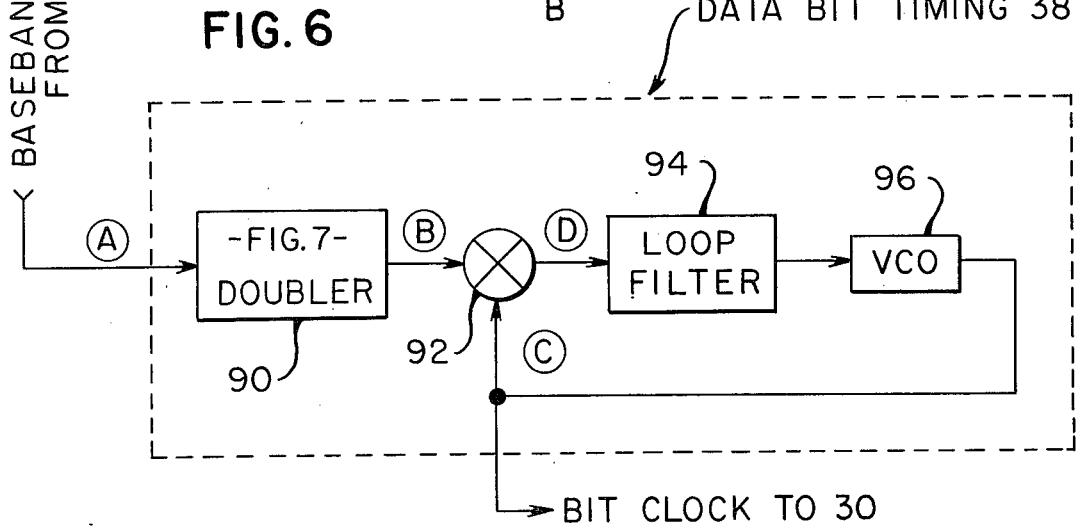

OUTPUT OF ENVELOPE DETECTOR 44 (FIG. 2)

OUTPUT OF SUMMER 50 (FIG. 2)

OUTPUT OF BANDPASS FILTER 70 (FIG. 4)

INPUT OF THRESHOLD DETECTOR 76 (FIG. 4)

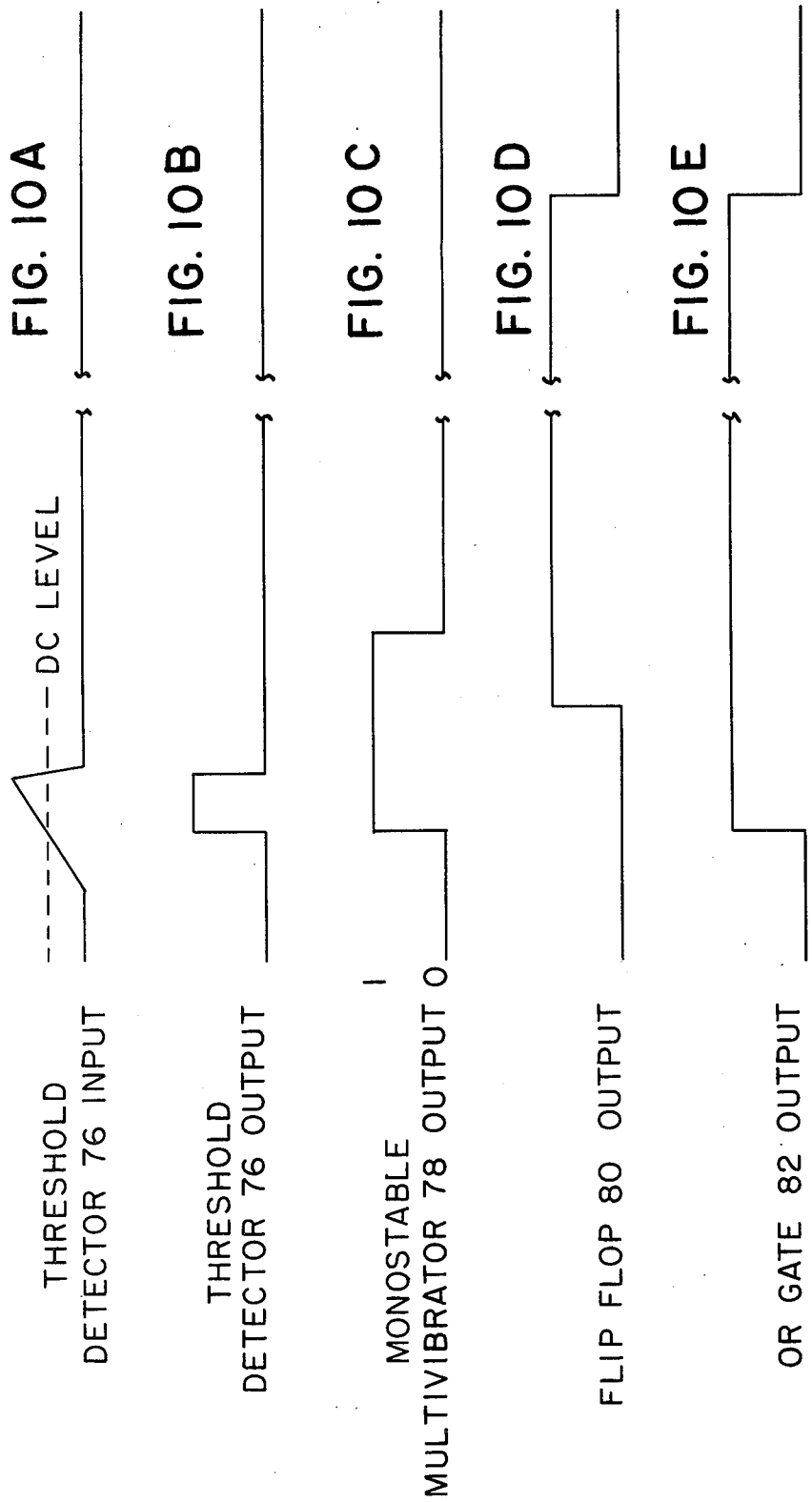

SPREAD SPECTRUM DETECTOR

BACKGROUND OF THE INVENTION

The present invention is related to the field of spread spectrum communication systems and more particularly, to a spread spectrum receiver which utilizes a detector that incorporates a dither detection technique.

Spread spectrum communication systems utilize a transmission bandwidth which is many times as large as the information bandwidth in order to achieve jam resistance.

Additional advantages of such systems include multipath signal rejection, and a low probability of unauthorized detection. In a spread spectrum communication system, a spread spectrum transmitter generates a date modulated signal, which modulated signal has its energy spread over a frequency band that is considerably wider than the frequency band of the data rate. Generally, this is accomplished with a carrier signal that is first modulated by an information or data signal, of relatively narrow bandwidth, and then by a wide bandwidth signal such as a pseudo-random (PR) signal or a pseudo-noise (PN) signal. The cumulative effect of this double modulation is to widen the bandwidth of the total signal to that of the widest modulating signal.

Within the receiver, the received spread spectrum signal is correlated against a signal corresponding to the modulating PN sequence signal utilized in the transmitter. The effect of this correlation, is to spread any received CW (continuous wave) type jamming signal over a wide band of frequencies so as to enable a filter to remove the major energy portions of the jamming signal from the system.

One of the difficulties encountered with synchronizing a local PN sequence, generated in the receiver, to the PN sequence component incorporated in the received modulated signal (generated in the transmitter) is that when the local PN sequence is locked to the receive PN sequence, there usually exists a band in which locking is indicated. Therefore, although a locked condition is indicated, it may be that the match between the two sequences is "off" (out of phase) by an amount corresponding to the range, or width, of the band within which lock is indicated. Utilization of a dithering technique allows the band, within which a lock indication is provided, to be decreased to a smaller amount, which thereby decreases the deviation between the local generated PN sequence and the received PN sequence component in the received signal. In those receivers where both the local dithered PN sequence and the received data signal pass through the same PN correlator, the amount of PN dither has to be held to a small percentage of a PN baud period, otherwise the data error may be too large under low signal-to-noise conditions. A baud period, for information purposes, corresponds to a time segment of a digital sequence. Since the amount of dither has to be held to a small percentage, the PN loop performance may deteriorate to the point where, under low signal-to-noise conditions, proper phase locking is not achieved.

One prior art patent of particular interest is U.S. Pat. No. 3,706,933 entitled, Synchronizing System in the Presence of Noise, by F. W. Bidell et al. The system disclosed in the referenced patent utilizes a locally generated coded signal and an orthogonally related version of the locally coded signal as the demodulation signals. The received signal is directed to a signal channel wherein a first mixer hetrodynes the locally coded signal with the received signal and wherein the received signal is also directed to a reference channel wherein a second mixer hetrodynes the orthogonally related verion of the locally coded signal with the received signal. The demodulated signals from the mixers are then compared and utilized to drive the locally coded signal into synchronization with the received signal.

Additional patents of interest for their teachings are:

U.S. Pat. No. 3,350,644 entitled, "Slip Corrector Means and Method for Multistation Networks", by R. J. McNair;

U.S. Pat. No. 3,351,859, entitled "Communication System Employing Multipath Rejection Means" by E. J. Groth, Jr. et al.;

U.S. Pat. No. 3,478,268, entitled, "Suppression of Strong Interfering Signals in a Radio Receiver", by G. J. Coviello;

U.S. Pat. No. 3,665,472, entitled, "Two-Way Communication System Employing Two-Clock Frequency Pseudo-Noise Signal Modulation", by Kartchner et al.;

U.S. Pat. No. 3,699,447, entitled, "Wideband Frequency Modulation Communications System," by W. T. Frost;

U.S. Pat. No. 3,714,573, entitled "Spread-Spectrum Position Monitoring System", by B. C. Grossman;

U.S. Pat. No. 3,731,198, entitled "Synchronization Device for Anit-Jamming Communications System," by H. L. Blasbalg;

U.S. Pat. No. 3,878,334, entitled, "Data Synchronizing Systems", by P. H. Halpern; and U.S. Pat. No. 3,878,468, entitled, "Joint Equalization and Carrier Recovery Adaptation in Data Transmission Systems", by D. D. Falconer, et al.

The present invention directs itself to the particular problem of providing an increased, or improved, signal-to-noise ratio in the PN loop of a spread spectrum receiver without degrading the data error performance.

SUMMARY OF THE INVENTION

In a spread spectrum detector in which a received coded signal is to be detected utilizing a locally generated similarly coded signal, a first channel and a second channel and a means for applying the received coded signal to the first and second channels. Within the first channel there is provided a first correlation means for correlating the received coded signal with a locally generated coded signal to provide a detected received coded signal. Additionally, there is provided a means responsive to the detected received coded signal for providing a lock indication signal when the degree of synchronization between the coded signal and the received coded signal is within a desired range. A local means is included in the second channel for generating the locally coded signal and a dithered coded signal, the phasing of which can be varied in response to a control signal. A second correlation means positioned in the second channel is adapted to receive the received coded signal and the generated dithered coded signal, with the second correlation means providing a signal indicative of the degree of synchronization between the received coded signal and the generated dithered coded signal.

Additionally there is provided a means which is responsive to the provided signal from the second correlation means for generating the control signal as a function of the provided signal and for directing the control signal to an input to the local means so as to drive the dithered coded signal into synchronization with the received coded signal.

From the foregoing, it can therefore be seen, that it is a primary object of the present invention to provide an improved spread spectrum detector.

It is another object of the present invention to provide a spread spectrum detector wherein dithering techniques improve phase locking conditions.

These and other objects of the present invention will become more apparent when taken in conjunction with the following description and drawings wherein like characters indicate like parts and which drawings form a part of the present disclosure.

BRIEF DESCRIPTION OF THE DRAWINGS

FIG. 1 is a block diagram of a transmitter-receiver in which the present invention finds particular utility;

FIG. 3 is a block diagram of a dither modulator which may be used for the corresponding labeled block shown in FIG. 2;

FIG. 5 is a schematic diagram of a typical correlator;

FIG. 6 is a block diagram of a data bit timing loop which may be used for the corresponding labeled block shown in FIG. 1;

FIGS. 10A to 10E are still further waveforms useful in understanding the operation of the present invention.

DESCRIPTION OF THE PREFERRED EMBODIMENT OF THE INVENTION

Figure 2:
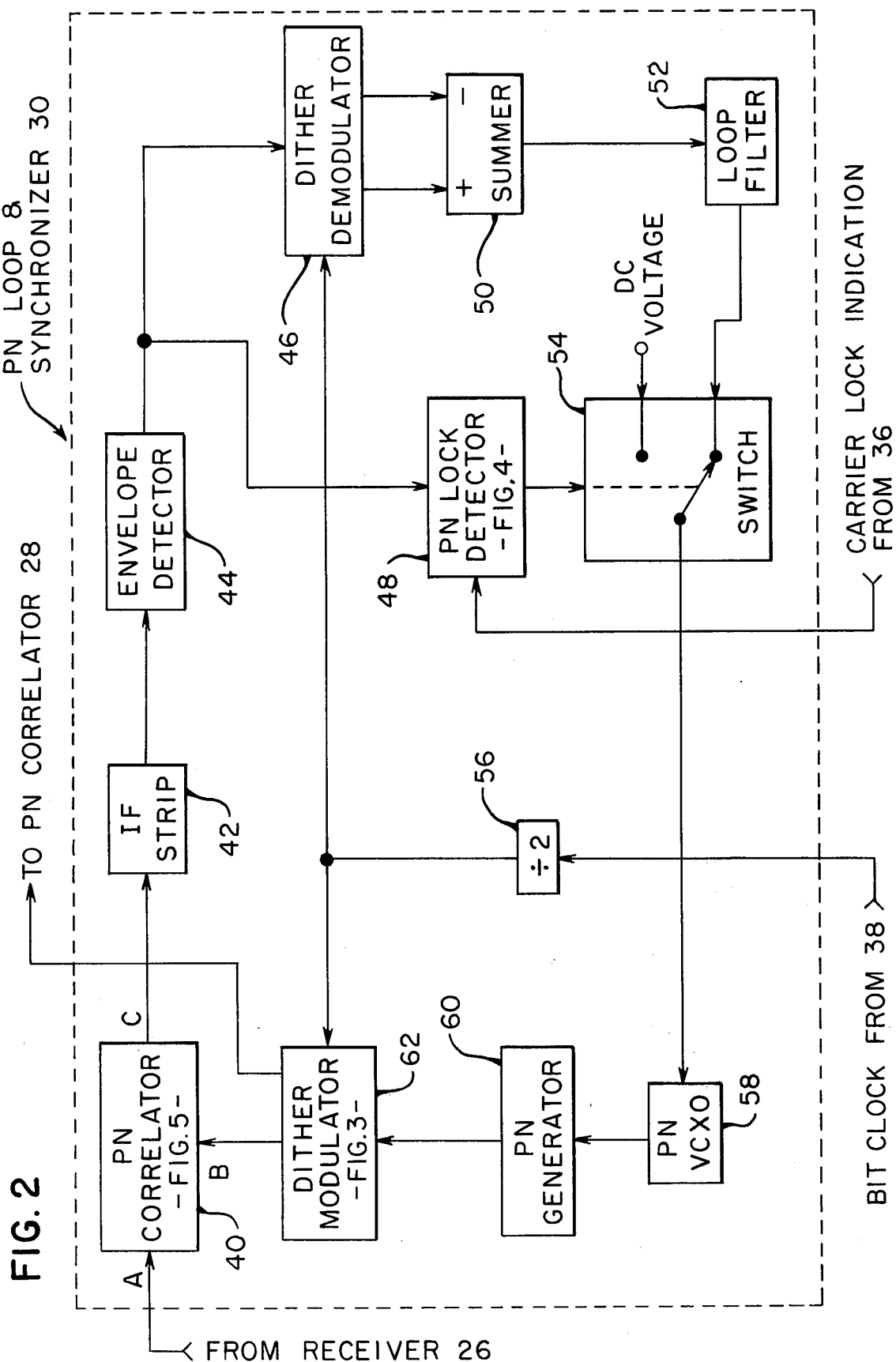
FIG. 2 is a block diagram of the PN timing loop and synchronizer block of FIG. 1.

Referring to FIG. 1 wherein a transmitter of the type that may be used in conjunction with the detector of the present invention is shown comprised in part of a carrier oscillator 10 and a phase modulator 12. The carrier oscillator 10 provides a carrier signal to an input of the phase modulator 12. A data signal, which is to be transmitted, is applied to the other input of the phase modulator so as to PSK (phase shift key) modulate the carrier signal from oscillator 10. The data signal may take the form of digital bits which bits represent the information that is to be transmitted. The PSK modulated signal is directed to a second phase modulator 18. A PN (pseudo random) clock oscillator 14 provides a stable clock signal to a PN sequence generator 16. A PN sequence generator generates a sequence of binary pulses having a length $2^n - 1$ in which n corresponds to the number of stages contained in the shift registers which form the generator. In response to the PN clock signal, the PN generator provides a pseudo-random binary sequence of pulses to an input of the second phase modulator 18. The PN sequence signal modulates the previously modulated carrier signal from phase modulator 12 and directs this further modulated signal to the input of transmitter 20. The rate of the PN generator 16 is substantially higher than the data bit rate. This difference in rate effectively spreads the signal at the output of the phase modulator 18 over a wider band of frequencies. The transmitter 20 then transmits, via antenna 22, the spread spectrum signal to the receiving antenna 24.

The receiver 26, connected to the receiving antenna, receives and amplifies the spread PSK modulated signal and sends the signal to a PN correlator 28, and to a PN timing loop and synchronizer 30. The PN correlator 28 corresponds to a first signal path, or first channel, while the PN timing loop and synchronizer 30 corresponds to a second signal path, or second channel. The PN timing loop and synchronizer 30 operate to generate a local PN sequence that is the same as the PN sequence generated by the PN generator 16 located in the transmitter except that the locally generated sequence, absence loop controls, is asynchronous with respect to the PN sequence component in the received signal. The local PN sequence must therefore be varied, or swept, in phase until it is synchronized with the PN modulation component of the received signal. When the phase relationships are the same, the signals are said to be in a "locked" condition. When the local PN sequence, from the timing loop 30 is in a locked condition, it is being exactly correlated with the PN modulation component of the received signal by the PN correlator 28. The output of the PN correlator 28 is directed to the IF strip 32 and corresponds to a de-spread PSK modulated signal. Due to intentional jamming and/or natural interferences, the output signal from the PN correlator 28 may also contain wideband noise and jamming signal components. The wideband signals are filtered out by the IF strip 32 thereby substantially reducing the energy content of the undesired signal components. The de-spread PSK modulated signal from the IF strip 32 is directed to the input of a carrier correlator 34 and a carrier recovery loop 36. The carrier recovery loop 36 generates a carrier signal corresponding to the received carrier signal. This generated carrier signal is then locked to one of the phases of the carrier signal component of the signal received from the IF strip 32. The locking signal from loop 36 is directed to an input of the PN timing loop and synchronizer 30. The other output from the carrier recovery loop 36 is correlated with the output signal from the IF strip 32 by means of the carrier correlator 34. The output signal from the carrier correlator 34 is a baseband data signal which contains a minimum number of undesired signal components corresponding to noise and/or jamming signals. The baseband data out signal corresponds to a data signal wherein the carrier component and the PN modulating component have been removed. The baseband data signal from the carrier correlator 34 is directed to a data bit timing loop 38, the output of which is directed back to an input of the PN timing loop and synchronizer 30. The data bit timing loop 38 generates a clean bit timing signal, at the data clock rate, and locks it, with the proper phase relationship, to the baseband data signal. Although not shown, it is well within the state of the art to provide a data processor which can reclock (detect) the data from the baseband data signal at the output of the carrier correlator 34 when a data bit timing signal is provided, as is the case at the output of the data bit timing loop 38.

Referring now to FIG. 2, the PN loop and synchronizer 30 receives the output signal from the receiver 26 at the input to a PN correlator 40. The schematic details of the PN correlator are illustrated in FIG. 5 and will be described at a later point in the specification. The PN correlator 40 receives at its other input the output signal from a dither modulator 62. The logic schematic diagram of the dither modulator is illustrated in FIG. 3. The correlator provides an output signal indicative of the degree of correlation between the signals at its inputs. This correlation signal is directed to an IF strip 42.

A PN VCXO (voltage controlled crystal oscillator) 58 is used to provide a stable clocking signal to the input of the PN generator 60. The rate of the VCXO provided clocking signal is a function of the magnitude and the polarity of the signal present at its input. The PN sequence generated by generator 60 is the same sequence as that provided by the PN generator 16 of FIG. 1. The phase of the PN sequence is adjusted by the output signal from the VCXO 58. The PN sequence from the generator 60 is directed to the dither modulator 62 which modulator modulates the sequence in phase, plus and minus, some percentage of a PN baud period in response to a bit clock signal.

Figure 9A:
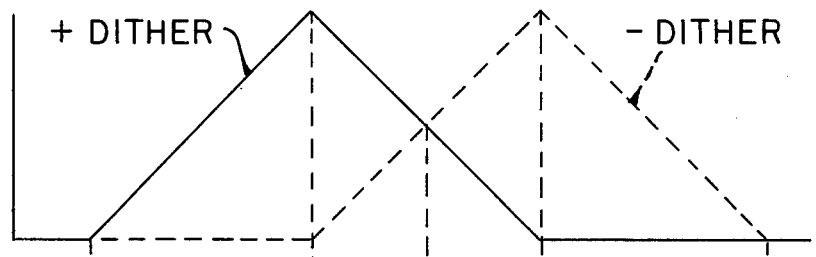
FIGS. 9A to 9D are additional waveforms useful in understanding the operation of the present invention.
Figure 9B:
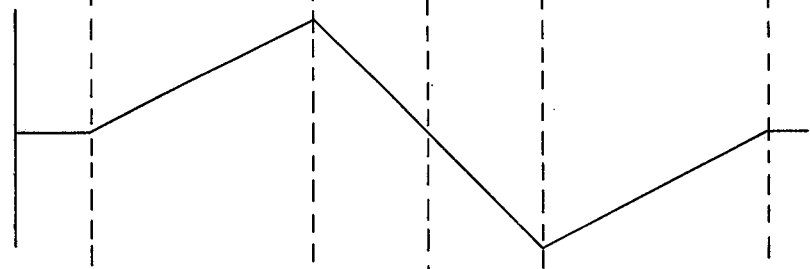

The bit clock signal, derived from the data bit timing loop 38 of FIG. 1, is applied to a divide-by-two circuit 56. The output signal from divider 56 is directed not only to the dither modulator 62 but also to a dither demodulator 46. An envelope detector 44 receives as its input the output signal from the IF strip 42. The envelope detector amplitude detects the amplitude of the signal present at its input and provides at its output a signal which is a function of the detected amplitude. FIG. 9A illustrates the output of the envelope detector 44, versus the phase relationship of the signal from the PN correlator 40. The detected signal is directed to the PN lock detector 48, which operates to control the "locked" and "unlocked" positions of a switch 54. The detected signal is also directed to the dither demodulator 46, the output of which corresponds to alternate switching of the detected signal into two channels for receipt at the input of a summer 50. The switching rate of the dither demodulator is controlled by the signal from the divide-by-two circuit 56. The signal at the + input to summer 50 is a DC voltage, the level of which is a function of the positive dithering of the local PN sequence. The signal at the − input to the summer 50 is a DC voltage, the level of which is a function of the PN sequence being minus dithered. The signals from the dither demodulator are subtracted from each other in the summer to provide an output signal which is proportional to the difference of the amplitudes of the plus and minus dither signals. In addition, this signal, as is shown in FIG. 9B, is a function of the phase difference between the local PN sequence and the PN sequence of the modulation component of the received signal, when the two PN sequences are within plus or minus 1 baud period of each other. This signal is directed to the input of a loop filter 52. The output of loop filter 52 is directed to a contact of the switch 54. The other contact of switch 54 is connected to a DC voltage.

Loop filter 52 establishes the bandwidth and the stability of the PN loop. For the switch position shown, a "locked" condition is occurring. That is, the output signal from loop filter 52 is driving the VCXO 58 which in turn is causing the locally generated PN sequence to correspond substantially to the PN sequence received from receiver 26. When the lock detector 48 indicates an "unlocked" condition, the moveable arm of switch 54 is moved to the DC voltage terminal. A DC voltage is applied to the terminal, which voltage is of a magnitude to cause the local PN sequence to search, that is, to change or sweep in phase. When the local PN sequence is somewhere within plus or minus 1 baud period of the received PN sequence, the lock detector 48 provides a "locked" indication to the switch 54, which indication automatically stops the search by moving the switch arm to the output of loop filter 52. An indication of whether the loop is in a "locked" or an "unlocked" condition is provided by the output signal from the carrier recovery loop circuit 36 shown in FIG. 1. In the preferred embodiment of the invention, a circuit capable of performing the function of carrier recovery is described in detail in U.S. Pat. Application Ser. No. 764,604 entitled "Offset Correction Circuit for Phase Detectors" by D. E. Sanders et al. the co-inventors of the subject matter of the present application which referenced application was filed Feb. 1, 1977, and assigned to NCR Corporation the Assignee of the present application.

Referring now to FIG. 3 wherein the block diagram of the dither modulator 62 is illustrated. The modulator is shown comprised of two identical delay lines, 64 and 66, and a switching element 68. The output signal from the PN generator 60 is applied to an input to the delay line 64 and to one switching terminal of switch 68. The output signal from the delay line 64 is directed to the input to the delay line 66 and to an input of the PN correlator 28, shown in FIG. 1. The output signal from the delay line 66 is directed to the other switch terminal on switch 68. The switching arm of switch 68 is responsive to the signal from the divide-by-two circuit 56. The delay rate for the delay lines 64 and 66 is adjusted to be ½ of the PN bit period. The two delay lines together provide a delay equal to 1 bit. The output taken from the movable arm of switch 68 is directed to the PN correlator 40. In all instances wherein a mechanical switch with movable arms is shown, it is to be understood that an electronic switch is actually used and that the diagrams are by way of illustration only. The PN sequence available at the output of delay line 66 occurs later than the PN sequence available at the output of delay line 64. In turn, the output signal from the delay line 64 occurs later than the PN sequence present at the input to delay line 64. The PN sequences available at the arm of switch 68, as it is switched back and forth, provides a PN sequence that is dithered by 1 PN bit period. The PN sequence from delay line 64 is exactly ½ the bit period between the other two such that they effectively are dithered plus and minus ½ a PN bit period to either side of the PN signal from delay line 64. The PN sequence directed to correlator 40 is therefore dithered plus and minus ½ bit period while the PN sequence to correlator 28 is not.

Figure 4:
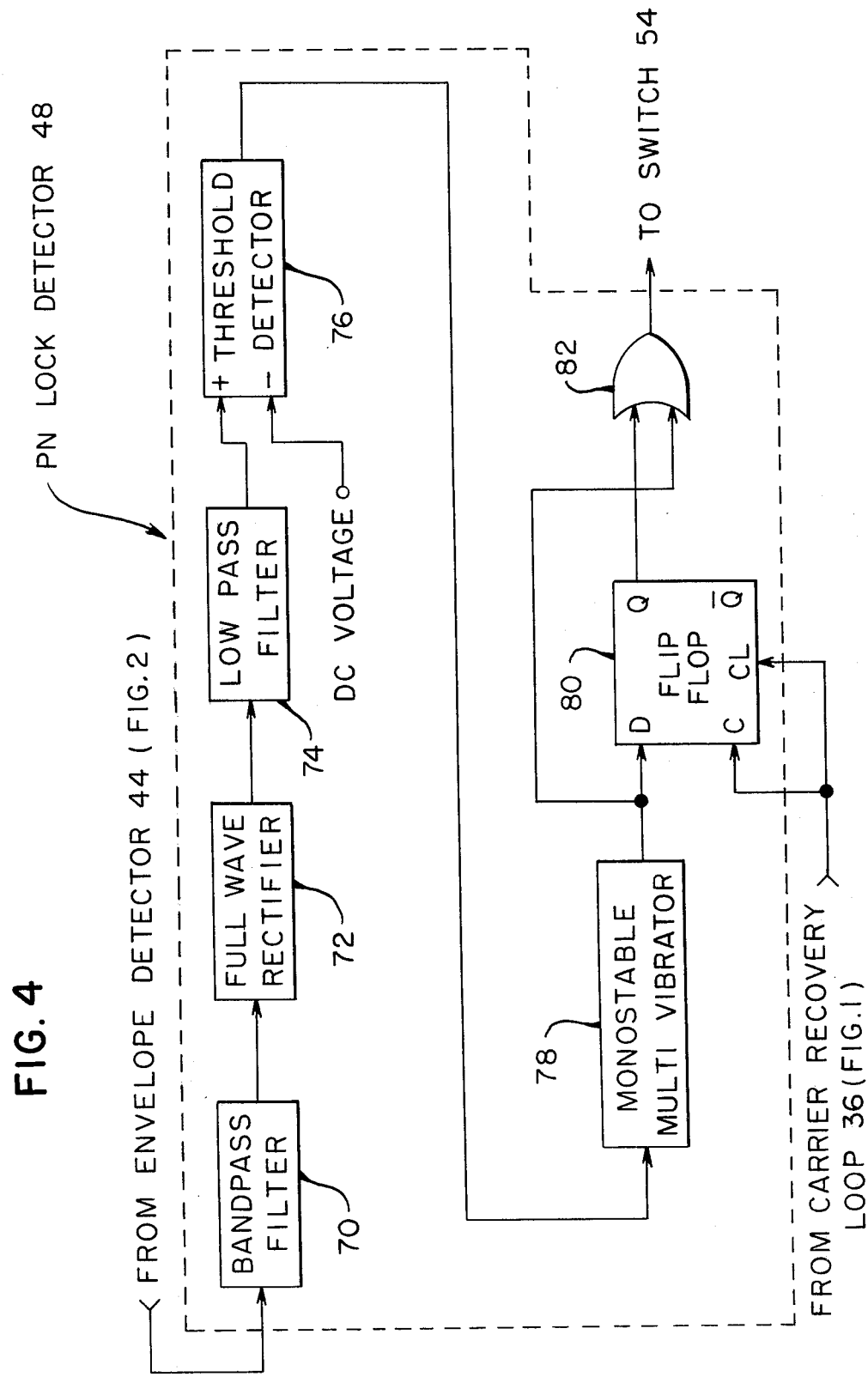
FIG. 4 is a block diagram of a PN lock detector which may be used for the corresponding labeled block shown in FIG. 2.

Referring now to FIG. 4 wherein is disclosed a PN lock detector 48. The output signal from the envelope detector 44 (FIG. 2) is directed to a bandpass filter 70. The bandpass filter operates to narrow the envelope signal and to delete undesired signal components. In the preferred embodiment of the invention, the bandpass is approximately equal to 1/10 of the data bit rate centered around the data clock frequency. The filtered signal is then directed to a full wave rectifier 72 for rectification. The rectified signal is then filtered by the low pass filter 74 to provide a DC signal, the amplitude level of which is a function of the level of the envelope detected signal from detector 44. A constant DC voltage is applied to the − input of a threshold detector 76 with the DC filtered signal from filter 74 being applied to the + input. When the DC level signal from filter 74 exceeds a pre-selected magnitude, the threshold detector 76 provides an output indication of this phenomenon.

A monostable multi-vibrator 78 receives the threshold indicating signal at its input and provides an output, the state of which indicates the existence or non-existence of the threshold signal. A D-type flip flop 80 receives at its D-input the output signal from the monostable multi-vibrator 78. The clocking input C and the CLEAR inputs of flip flop 80 are connected to the output of the carrier recovery loop circuit 36, shown in FIG. 1. The Q output from flip flop 80 is connected to one of the inputs of the OR gate 82. The other input to OR gate 82 is connected to the D-input of flip flop 80. A D-type flip flop is one, which upon the positive going transition of a clock signal, on its C input, will sample the signal present at its D-input and provide that signal at its Q output. The output of the OR gate 82 is directed to the movable arm of switch 54.

In operation then, the monostable multi-vibrator will remain in one state for a certain amount of time after a threshold signal is received on its input. This one state is logically detected by flip flop 80, and gate 82, to maintain switch 54 in the locked indicating position, namely connected to the output of the loop filter 52. When the signal from the carrier recovery loop 36 goes to a zero state, flipflop 80 is cleared to a zero state at the Q output, which in turn, through the logic of element 82 will move the arm of switch 54 to the DC voltage input terminal to institute a sweep of the PN sequence, generated by generator 60.

Referring now to FIG. 5, wherein a double balanced mixer, which may be used as the correlators 28, 34 and 40, is schematically shown. An input transformer 84 has its primary winding connected to a labeled set of inputs A and its secondary winding connected to a fullwave rectifier 86. An output transformer 88 has its secondary winding connected to a labeled set of output terminals C. The primary winding of transformer 88 is connected to the ends of the fullwave rectifier 86 opposite those of transformer 84. Center taps are provided in the secondary winding of transformer 84, and in the primary winding of transformer 88. These taps are connected to the modulating terminals labeled B.

In referring to FIGS. 1 and 2, wherein the correlators find particular utility, the terminals labeled A, B and C are correspondingly shown with the associated correlators 28, 34 and 40. As is generally known within the state of the art, the correlators are double balanced mixers of the type readily available on the commercial market, therefore their operation will not be discussed in detail.

Referring now to FIG. 6, wherein the block schematic diagram of the data bit timing loop 38 is illustrated. The baseband data signal, from the carrier correlator 34, is applied to the input of a double circuit 90. The doubler circuit operates to multiply the baseband signal by two and to provide this doubled signal, as an input, to a combining element 92. In the preferred embodiment of the invention, the combining element was an Exclusive OR gate. The output of the combining element is directed to a loop filter 94 which is designed to have a bandpass less than 1/10 of the data bit rate, centered about zero. The output of the loop filter is directed to a VCO (voltage controlled oscillator) 96. The nominal signal from the VCO 96 occurs at the data bit rate. The signal from loop filter 94 can sweep the phasing of the signal from VCO 96. The output signal from VCO 96 is fed back to the other input of the combining circuit 92 and to the PN timing loop and synchronizer circuit 30.

Figure 7:
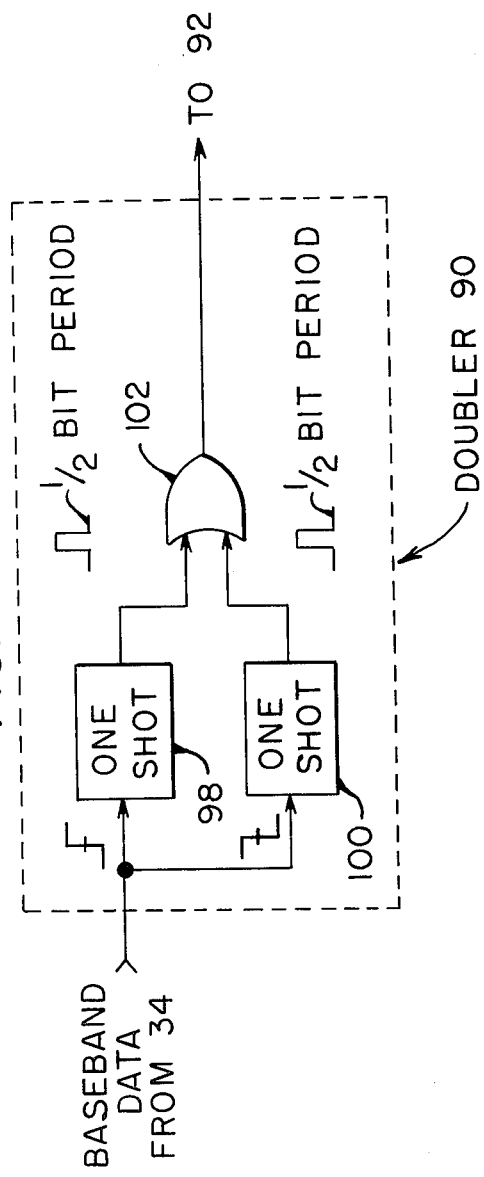
FIG. 7 is a schematic diagram of a doubler circuit which may be used in the data bit timing loop shown in FIG. 6.
Figure 8:
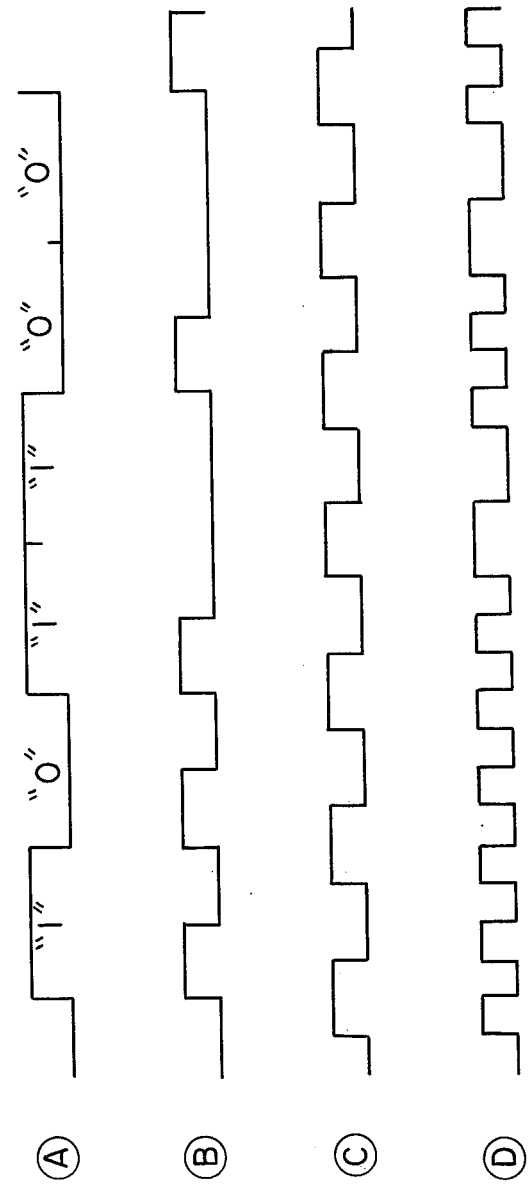
FIG. 8 shows waveforms useful in understanding the operation of the preent invention.

In FIG. 7 there is disclosed a circuit which may be utilized as the doubler 90, shown in FIG. 6. The circuit is comprised of two one-shot multi-vibrators 98 and 100 along with an OR gate 102. The baseband data signal from the carrier correlator 34 is directed to the inputs of the one-shot multi-vibrator's 98 and 100, with the outputs thereof being directed as independent inputs to the OR gate 102. The output signal from the OR gate 102 is directed to the combining element 92. The one-shots are selected so as to be complementary on their triggering levels, that is, one-shot 98 triggers on a positive going signal, while one-shot 100 triggers on a negative going signal. For a further clarification of this feature, reference is made to FIG. 8 wherein the waveforms labeled Ⓐ to Ⓓ correspond to like labeled points in FIG. 6.

Figure 9C:
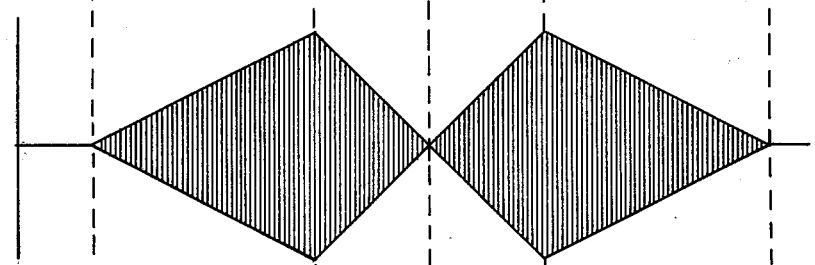
Figure 9D:
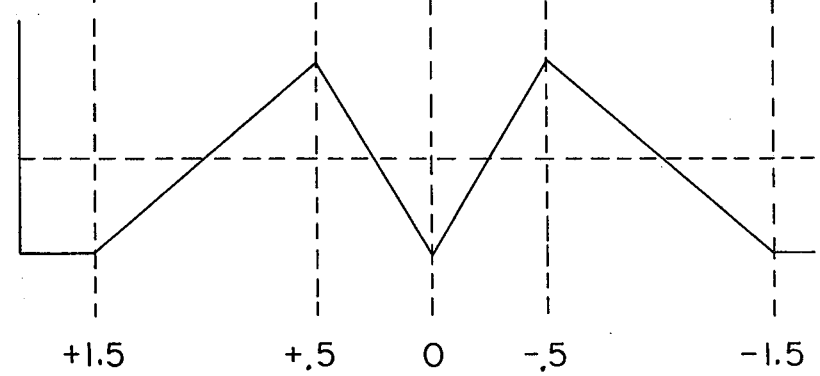

Referring now to FIG. 9A, wherein there is disclosed the output waveform generally present at the output of the envelope detector 44. The solid line envelope signal corresponds to the signal for a + dither. The dotted line envelope signal corresponds to the position of the envelope signal for a − dither. Absent a dithering signal, the peak amplitudes of the envelope signal would, for a locked condition wherein the no-phase difference existed, appear over the 0 bit period difference. With a dither signal going both plus and minus in a cyclic manner, the peak amplitude points of the plus and minus dither envelope signal appear equally distant from the 0 bit period position. The signal at the output of the summer 50 is shown in FIG. 9B. The signal present at the output of the bandpass filter 70 of FIG. 4 is shown in FIG. 9C. FIG. 9D illustrates the signal present at the + input to the threshold detector 76, along with the DC voltage level appearing at the − input to detector 76 (horizontal dotted line).

Referring now to FIG. 10A. The input signal to the threshold detector 76 is shown with a superimposed dotted horizontal line, corresponding to the selected DC threshold level. When the positive sloping waveform present at the input of detector 76 passes the DC threshold level, the threshold detector provides an output pulse; this pulse is depicted in FIG. 10B. The pulse has a width corresponding to the point at which the detector input signal drops below the DC level. The positive going edge of the threshold output signal causes the monostable multi-vibrator 78 to give out a logic one level signal. This signal is depicted in FIG. 10C. The logic one level signal has a duration which is long enough for the carrier recovery loop 36 to lock up and to give out a "locked" indication. When a logic one level signal is received at the D-input of the flip flop 80, it is gated to the Q output upon the occurrence of the next clock signal. This output is shown in FIG. 10D. The logic one pulse present at the D-input is gated with the logic one pulse from the Q output of the flip flop by the OR gate 33 to provide a logic one level PN loop lock detection signal. This signal is illustrated in FIG. 10E.

When there is a loss of carrier lock, the signal from the carrier lock detector 36 of FIG. 1 is a logic level zero, which signal will clear flip flop 80 to a logic level zero at the Q output.

The afore-described PN loop lock detector has several advantages over using the carrier lock detector output or the data bit timing lock detector output for a PN loop lock indication. One advantage is that the PN loop lock detector is faster, since it does not require a carrier lock, or a data bit timing lock for initial indication of PN lock. Another advantage resides in the fact that there is no false lock problems. While the local PN sequence is searching under good signal conditions, the carrier loop and data bit loop can false lock to spectral energy lines in the received spread spectrum signal. This is not the case with the present PN loop lock detector because the amplitude modulation of the signal at the output of the PN correlator 40, caused by the dither modulation of the local PN sequence, for all practical purposes disappears when the local PN sequence is not within plus or minus 1.5 baud periods of the received PN sequence.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

What is claimed is:

1. A detector for use in a communication receiver in which a received coded signal is to be detected utilizing a locally generated similarly coded signal, comprising:
   a first channel and a second channel;
   means for applying said received coded signal to said first channel and to said second channel;
   first correlation means included in said first channel for correlating said received coded signal with a generated coded signal received from said second channel to provide a detected received coded signal;
   means responsive to said detected received coded signal for providing a lock indication signal when the degree of synchronization between said generated coded signal and said received coded signal is within a desired range;
   local means included in said second channel for generating a coded signal and a dithered coded signal in response to a control signal;
   second correlation means adapted to receive said received coded signal and said generated dithered coded signal, said second correlation means providing a signal indicative of the degree of synchronization between said received coded signal and said generated dithered coded signal; and
   means responsive to said provided signal from said second correlation means for generating said control signal and for providing said control signal to said local means so as to drive said dithered coded signal into synchronization with said received coded signal.

2. The detector in accordance with claim 1 wherein said local means is a pseudo-random signal generator for generating a pseudo-random signal which corresponds to a pseudo-random signal component in the received coded signal.

3. A detector according to claim 1 wherein said local means is comprised of:
   a signal generator responsive to said control signal for generating a local coded signal the phase of which is a function of said control signal;
   a dither modulator receiving as one input thereof said local coded signal, said modulator comprised of, a first and a second serially connected delay means, each of said delay means providing a signal delay to the signal present at its inputs, which delay corresponds to a fixed time interval of said local coded signal; and
   switch means responsive to a periodic signal for alternately connecting the output of said second delay means and the input to said first delay means to an input of said second correlator means, the output from said first delay means being applied to an input of said first correlator means.

4. A detector in accordance with claim 1 wherein said second channel is further comprised of:
   lock detection means operatively connected to said second correlation means for providing a signal indicating the state of synchronization between the signals received by said second correlation means; and
   switch means responsive to said provided signal for operatively connecting said local means to a search signal for driving said dithered coded signal to search for synchronization with said received coded signal when said provided signal indicates a lack of synchronization, and for operatively connecting said local means to receive said control signal when said provided signal indicates the presence of a selected degree of synchronization between the received coded signal and the dithered coded signal.

5. A detector in accordance with claim 4 wherein said lock detection means is comprised of:
   a first filter means for filtering the signal from said second correlation means;
   rectifying means for rectifying the filtered signal from said first filter means;
   threshold detector means for providing a first output signal when said rectified signal is above a fixed threshold and a second output signal when said rectified signal is below said fixed threshold; and
   means for converting said first and said second output signals into said provided signal and for applying said provided signal to said switch means.

6. A detector in accordance with claim 1 and further comprising:
   a demodulator means operatively connected to receive the signal provided by said second correlation means, said demodulator means having first and second outputs and providing at said first output a signal indicative of the degree of dither of said dithered coded signal in a first direction and at said second output a signal indicative of the degree of dither in a second direction; and
   summer means operatively connected to said first and said second outputs for providing said control signal, said control signal being proportional to the degree of difference between the signals at said first and said second output of said demodulator means.

7. A detector in accordance with claim 6 and further comprising:
   envelope detector means interposed in the signal path between said second correlation means and said demodulator means for amplitude detecting the signal present at its input and for providing at its output a signal which is a function of the detected amplitude.

8. A detector in accordance with claim 7 and further comprising:
   filter means interposed in the signal path between said second correlation means and said envelope detector means for filtering out all signal components outside of a desired intermediate frequency range.

9. In a receiver for a spread spectrum coded signal which signal is comprised of a carrier signal that has been phase modulated by a data signal and by a pseudo-random sequence signal, a detector comprising:

a first and a second signal channel;

means for receiving and applying said received spread spectrum coded signal to said first channel and to said second channel;

first correlation means included in said first channel for correlating the pseudo-random sequence component of said received signal with a pseudo-random signal received from said second signal channel so as to provide a partially detected received signal;

carrier demodulation means responsive to said partially detected received signal for demodulating the carrier signal component from said partially detected signal so as to provide a detected received signal;

local means included in said second channel for generating a pseudo-random signal and a dithered pseudo-random coded signal the phasing of which is a function of a control signal;

second correlation means adapted to receive said spread spectrum coded signal and said generated dithered pseudo-random coded signal for providing an error signal indicative of the degree of synchronization between said signals; and means operatively connected to said second correlation means for providing said control signal to said local means as a function of said error signal so as to drive the phasing of said generated dithered pseudo-random coded signal to a minimum.

10. A detector in accordance with claim 9 wherein said local means is comprised of:

a signal generator responsive to said control signal for generating a pseudo-random coded signal the phase of which is a function of said control signal;

a dither modulator receiving as one input thereof said local coded signal, said modulator comprised of a first and a second serially connected delay means, each of said delay means providing a signal delay to the signal present at its inputs, which delay corresponds to a fixed time interval of said pseudo-random coded signal; and switch means responsive to a periodic signal for alternately connecting the output of said second delay means and the input to said first delay means to an input of said second correlator means, the output from said first delay means being applied to an input of said first correlator means.

11. The detector in accordance with claim 9 wherein said carrier demodulation means is comprised of:

a third correlator having one input connected to the output of said first correlator and another input connected to receive a locally generated carrier signal so as to provide at an output a detected received signal; and a carrier recovery loop having an input connected to the output of said first correlator for generating and providing to said third correlator a local carrier signal in synchronism with the carrier signal component of said received spread spectrum coded signal and for also providing an indication signal indicating synchronization or the lack of synchronization between said carrier signal component and said generated local carrier signal.

12. The detector in accordance with claim 11 and further comprising:

data rate detection means operatively connected to said third correlator means for providing a rate signal indicative of the rate of the data signal component of said received signal, said rate signal being directed to said local means for controlling the rate of said dithered pseudo-random coded signal.

13. A detector in accordance with claim 11 wherein said second channel is further comprised of:

lock detection means operatively connected to said second correlation means for providing a signal indicating the state of synchronization between the signals received by said second correlation means; and switch means responsive to said provided signal for operatively connecting said local means to receive said control signal when said provided signal indicates the presence of a selected degree of synchronization between the pseudo-random sequence component of said received signal and said dithered pseudo-random coded signal.

14. A detector in accordance with claim 13 wherein said lock detection means is comprised of:

a first filter means for filtering the signal from said second correlation means;

rectifying means for rectifying the filtered signal from said first filter means;

threshold detector means for providing a first output signal when said rectified signal is above a fixed threshold and a second output signal when said rectified signal is below said fixed threshold; and means for connecting said first and said second output signals into said provided signal and for applying said provided signal to said switch means.

15. A detector in accordance with claim 9 and further comprising:

a demodulator means operatively connected to receive the error signal provided by said second correlation means, said demodulator means having first and second outputs and providing at said first output a signal indicative of the degree of dither of said dithered pseudo-random coded signal in a first direction and at said second output a signal indicative of the degree of dither of said dithered pseudo-random coded in a second direction; and summer means operatively connected to said first and said second outputs for providing said control signal, said control signal being proportional to the degree of difference between the signal at said first and said second output of said demodulator means.

16. A detector in accordance with claim 15 and further comprising:

envelope detector means interposed in the signal path between said second correlation means and said demodulator means for amplitude detecting the signal present at its input and for providing at its output a signal which is a function of the detected amplitude.

17. A detector in accordance with claim 16 and further comprising:

filter means interposed in the signal path between said second correlation means and said envelope detector means for filtering out all signal components outside of a desired intermediate frequency range.

* * * * *